(No Model.)

W. H. SMITH.
CLUTCH FOR BAND PULLEYS.

No. 380,952. Patented Apr. 10, 1888.

WITNESSES:
G. Jobsen
E. L. Beckerleg

INVENTOR.
W. H. Smith
BY L. W. Tinsabaugh
ATTORNEY.

UNITED STATES PATENT OFFICE.

WILLIAM H. SMITH, OF CHICAGO, ILLINOIS.

CLUTCH FOR BAND-PULLEYS.

SPECIFICATION forming part of Letters Patent No. 380,952, dated April 10, 1888.

Application filed December 9, 1887. Serial No. 257,428. (No model.)

*To all whom it may concern:*

Be it known that I, WILLIAM H. SMITH, a citizen of the United States of America, residing at Chicago, in the county of Cook and State of Illinois, have invented certain new and useful Improvements in Clutches for Band-Pulleys, of which the following is a specification, reference being had therein to the accompanying drawings.
My invention relates to improvements in friction-clutches for band and other pulleys.

The object of my invention is to provide a safe and reliable clutch for engaging band-pulleys so as to impart motion thereto from the main driving-shaft.

My invention consists of a double-jawed and independently-operating clutch adapted to engage both sides of an annular rim on the band-wheel, one jaw of the clutch being brought into frictional contact with one side of the rim which starts the pulley and brings it up to the required speed, the other jaw being subsequently brought into positive engagement with notches or corrugations on the other side of the rim to lock the clutch thereon and prevent the clutch from slipping.

Figure 1:
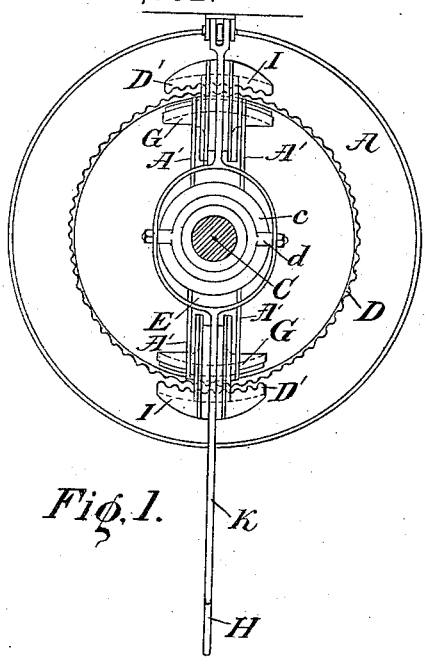
Figure 2:
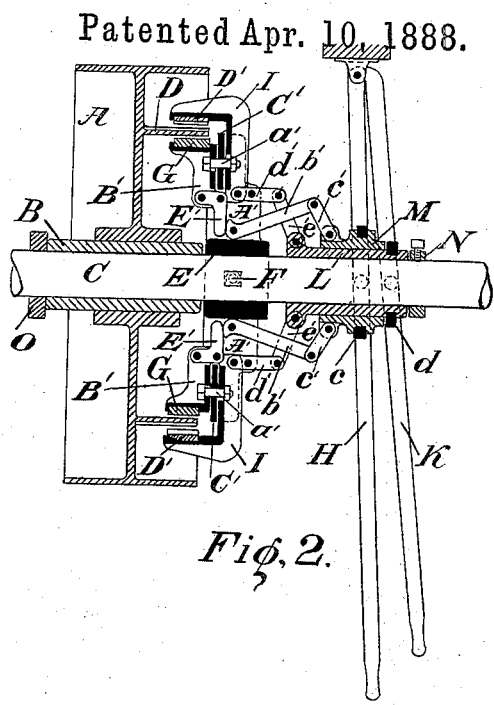
Figure 3:
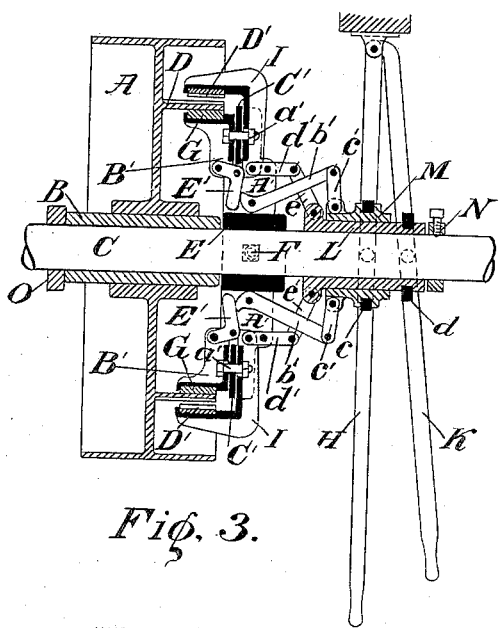
Figure 4:
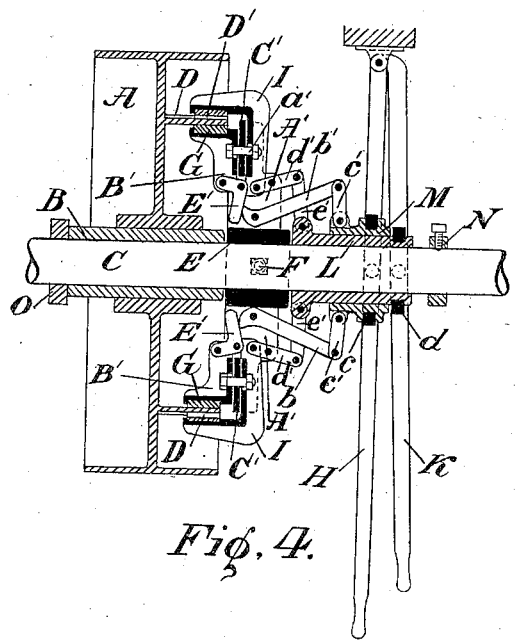

Referring to the drawings, Figure 1 is an end view of my improved clutch mechanism. Fig. 2 is a vertical sectional view of the device with the jaws of the clutch open. Fig. 3 is a vertical sectional view of the device with the friction-jaws in engagement with the under side of the rim of the pulley. Fig. 4 is a vertical sectional view of the device with the frictional-jaw and the locking-jaw in contact with the rim of the band-pulley.

A indicates a band-pulley having the sleeve B fitting the bore of the pulley, said sleeves and pulley being loosely mounted on the main driving-shaft C in the usual manner.

D is an annular rim secured to or cast on the side of the band wheel or pulley A, said rim being provided with corrugations or notches on the outside, as shown in Fig. 1, for a purpose which will be more fully described hereinafter.

E is a sleeve secured to the main driving-shaft C by the pin or set-screw F, so as to revolve therewith, said sleeve being provided with arms A', which support the clutches and a portion of the devices which operate them, to engage or disengage the rim D.

G are the shoes or friction-clutches mounted on the brackets B', and adapted to impinge on the under side of the rim D, said brackets being held in position by the bolts a, which pass through the plate C' and through the bracket I, which support the locking shoes or clutches D'.

The brackets B' and I are provided with slots through which the bolts a' pass, so as to admit of their movement toward and from the annular rim D. The bell-crank levers E' have one arm pivoted to the lower end of the bracket B', and the other arm of said lever being pivoted to the arms A'.

b' are levers pivoted on the arms A' near the inner end, while the outer end of said levers are pivotally secured to the sleeve M by means of the links c'. The inner ends of the levers b' are cam-shaped and adapted to impinge against the lower end of the bell-crank levers E'. The sleeve M is provided with a groove in its periphery to receive pins c, secured to the yoke of lever H, so that when the sleeve M is moved forward by the lever H the clutches G will be brought in contact with the under side of the rim D to impart motion to the pulley-wheel A to bring it up to the speed of the shaft C.

I will now proceed to describe the devices by which the clutch is locked to the rim D, so as to prevent the clutch from slipping in case there are heavy strains or loads on the band-pulley.

The brackets I, on which the locking-shoes D' are secured, are attached at their lower ends to the inner ends of the bars or links d' by pivot-pins, said links being pivoted to the arms A' of the sleeve E, near the center thereof. The outer ends of the links d' are pivotally connected to the sleeve L by means of the links e', said sleeve L being arranged to work back and forth on the shaft C by means of the lever K and pins d, which project into a groove in the periphery of the sleeve L, so that when the lever K is pushed forward the locking-shoe D' is brought into engagement with the corrugations on the periphery of the rim D, the under side of the shoe or jaw D' being correspondingly corrugated to mesh with the corrugations on the periphery of the rim D', and in this manner the rim is firmly clamped between the two jaws of the clutch and all possibility of slipping obviated.

It will be noticed that the jaw or shoe G is first brought into contact with the rim D, and that by frictional contact therewith the band-pulley is set in motion, and when it has attained the same velocity as the shaft C the locking jaw or shoe is then engaged with the corrugations in the rim to lock the clutch onto the rim D.

N is a band or sleeve secured to the shaft C by means of a suitable set-screw to form a stop for the sleeves which operate the clutching mechanism. O is a similar band or sleeve secured to the shaft at the end of the sleeve B, so as to prevent said sleeve and the pulley A from moving longitudinally on the shaft C.

Having thus described my invention, what I claim, and desire to secure by Letters Patent, is—

1. In a clutching device for band-pulleys, a pulley provided with a projecting rim, in combination with shoes or jaws adapted to impinge on said rim and impart motion to the pulley by frictional contact, and supplemental shoes or jaws adapted to engage the other side of the rim after the pulley has been set in motion.

2. In a clutching device for band-pulleys, a pulley provided with a projecting annular rim having its external surface corrugated, in combination with a shoe having its face similarly corrugated and adapted to engage the corrugations in the rim, as set forth.

3. In a clutching device for band-pulleys, a pulley provided with a projecting rim, in combination with clamping-jaws adapted to clutch both sides of the rim, said jaws being independently operated, one set of jaws to impart motion to the pulley by frictional contact, while the other positively locks or holds the pulley from slipping.

In testimony whereof I affix my signature in presence of two witnesses.

WM. H. SMITH.

Witnesses:
SAM H. LEA,
ALBERT E. ANDERSON.